(12) United States Patent
Kuhlmeier

(10) Patent No.: US 10,085,574 B2
(45) Date of Patent: Oct. 2, 2018

(54) ULTRA COMPACT ONE-HANDED FOLDING MAT

(71) Applicant: Ralph Kuhlmeier, Boulder, CO (US)

(72) Inventor: Ralph Kuhlmeier, Boulder, CO (US)

( * ) Notice: Subject to any disclaimer, the term of this patent is extended or adjusted under 35 U.S.C. 154(b) by 0 days.

(21) Appl. No.: 15/607,355

(22) Filed: May 26, 2017

(65) Prior Publication Data

US 2017/0347816 A1    Dec. 7, 2017

Related U.S. Application Data

(60) Provisional application No. 62/344,375, filed on Jun. 1, 2016.

(51) Int. Cl.

| | |
|---|---|
| *B32B 3/10* | (2006.01) |
| *A47G 9/06* | (2006.01) |
| *B29C 37/00* | (2006.01) |
| *A45C 13/00* | (2006.01) |
| *A47G 27/02* | (2006.01) |
| *B29L 31/52* | (2006.01) |
| *B29L 31/00* | (2006.01) |

(52) U.S. Cl.
CPC ............ *A47G 9/062* (2013.01); *A45C 13/002* (2013.01); *A47G 27/0206* (2013.01); *B29C 37/0053* (2013.01); *B29L 2031/52* (2013.01); *B29L 2031/751* (2013.01); *Y10T 428/24215* (2015.01); *Y10T 428/24264* (2015.01)

(58) Field of Classification Search
CPC .... Y10T 428/24215; Y10T 428/24264; A47G 9/062; A63B 6/00
See application file for complete search history.

(56) References Cited

U.S. PATENT DOCUMENTS

| | | | |
|---|---|---|---|
| 5,051,293 A | 9/1991 | Breitscheidel et al. | |
| 9,161,641 B2 | 10/2015 | Wentland | |

OTHER PUBLICATIONS www.qwickstand.com, , , accessed Mar. 2017.
www.khataland.com, , ,accessed Mar. 2017.

*Primary Examiner* — Alexander S Thomas
(74) *Attorney, Agent, or Firm* — Craig W Barber; Barber Legal

(57) ABSTRACT

A portable mat which keeps itself clean teaches a combination of nine upper surface panels of hard rubber, EPDM, hard neoprene, a very durable bottom surface/substrate holding the mat panels, which may be the neoprene in unitary body embodiments or a separate material in other embodiments, a formula for placement of the panels upon the substrate, a specific folding sequence, and a tenth mud-flap outside of the regular 3×3 pattern of the other nine panels which completes the folding sequence with every bottom surface covered by another bottom surface and no top panel in contact with any bottom surface. A handhold at one corner and indicia on the top surface assist the user in properly folding, as do the formulaic gaps which allow tight proper folding and prevent improper folding.

20 Claims, 19 Drawing Sheets

Figure 7

| SEPARATION | 1 | 2 | 3 | 4 | 5 |
|---|---|---|---|---|---|
| FOLD # | 1 | 2 | 3 | 4 | 5 |
| TYPE | VALLEY | MOUNTAIN | VALLEY | MOUNT. | BACK |
| PANEL THICKNESS FOLDED | 1 | 1 | 3 | 3 | 1 (MUD-FLAP) |
| SEPARATION WIDTH (multiple panel thicknesses) | 2X | 0* | 6X | 4X | 0* |
| * Zero separations obviously greater than zero due to mat edge irregularities, for easier flattening and folding, etc. | | | | | |

1532a-j

ULTRA COMPACT ONE-HANDED FOLDING MAT

CROSS-REFERENCE TO RELATED APPLICATIONS

This application claims the priority and benefit of previously filed U.S. Provisional Application No. 62/344,375 in the name of the same inventor and entitled Re-usably Clean Mat & Fold, the entire disclosure of which is incorporated herein by this reference.

FIELD OF INVENTION

This invention relates generally to multi-purpose sporting and outdoor work goods and particularly to folding athletic mats allowing users to keep their feet and seat clean while changing clothing, especially footwear, when out of doors, standing or sitting.

STATEMENT REGARDING FEDERALLY FUNDED RESEARCH

This invention was not made under contract with an agency of the US Government, nor by any agency of the US Government.

BACKGROUND OF THE INVENTION

Mats to keep feet clean generally are designed for household use, that is, the mat is large, relatively stiff, and has clearly marked top and bottom sides because the bottom side will remain permanently downward.

Taking such mats camping, skiing, skating, hiking and so on is not remotely convenient. While a skier at the slope or lift needs to put on ski boots or skis, lugging around a stiff rolled up mat is a bulky nuisance and a quick way to kill the pleasure of outdoor athletics.

In addition, note that when a non-folding household type mat is rolled up (since most household mats are too stiff to fold), necessarily the dirty bottom side of the mat (which rested on the ground) is rolled up against a clean portion of the top side of the mat. This instantly transfers dirt from the bottom to the top. If the user attempts to use the mat a second time, they will find the formerly clean upper surface has become dirty during the period of storage (rolled up) due to the dirty side contacting the clean side.

Thus for all these reasons, household mats are not really useful, nor applicable to, athletic mats for outdoor usage.

Folding mats may be used in the outdoor context but in general folding mats may be so very light in weight—small tarps more than mats/pads—that they tend to stick to the bottom of the foot, to footwear, equipment, and so on, or just blow away in a breeze. Folding mats made of more sturdy material would be desirable, but would still leave a frustrating problem. In general, a mat will be placed on the ground or snow and then stepped on, thus grinding dirt, mud, snow, ice or the like into the bottom of the mat. When the ordinary style of mat is folded, all this clinging dirt then transfers itself from the bottom/dirty side to adjacent (after folding) parts of the top side, unless the mat is one of the designs which aim to prevent this. Thus, the folding mat is usable for clean feet exactly once, after which the act of folding it transfers dirt to the previously clean side. The second time the mat is unfolded, the top surface is already dirty.

Another challenge with such traditional style mats that do not attempt to solve these problems is that the user will get their hands dirty while folding the mat together, one hand on a clean portion and one hand on a dirty portion, since it is impossible to fold a mat without placing the fingers around one edge or another. Worse, the dirty side will be partially exposed and will immediately begin donating the dirt if picked up off the ground to the environs: the user's hands during casual contact, the car seat, the shelf, etc. It would obviously be preferable to provide a mat with one-handed folding characteristics.

Foldable mats have been known. In general such mats comprise foam core materials with a very thin material on the top and bottom, which is then molded together in a manufacturing process which is very specific to foam only.

Attempts have been made to provide folding mats which address such issues. U.S. Pat. No. 9,161,641 to Wentland on Oct. 20, 2015 teaches a foldable foam-type mat in which a single cushioning material has been grooved in certain places to allow folding.

Fairly simply, the '641 reference teaches two folds. This may also be found in such real world-products as the "Qwick Stand" mat. (www.qwickstand.com) The foam construction means that the mat is thick and quickly gets thicker as the thickness doubles with each fold. Fairly bulky yoga mats such as the Yofo mat (www.khataland.com) also feature a foam sandwich construction and also become quite bulky quite quickly as the folds double the thickness repeatedly.

U.S. Pat. No. 5,051,293 to Breitscheidel et al on Sep. 24, 1991 teaches a foldable foam mat which, like Wentland, has a single unibody construction of the cushioning material with grooves or depressions across it. There appears to be no substrate to hold discontinuous panels together. Unlike Wentland, the '293 patent does show that the grooves may be of different types: single grooves versus double grooves, thus encouraging double-folding. However, there is no indication that a formula for groove width may be applied, no indication of a substrate, etc etc.

All such mats essentially require two handed folding involving picking up the mat and manipulating it two handed.

It is worth noting that some of these mats do achieve a "dirty-side to dirty-side" fold by starting with a counter-intuitive "book fold": a type of fold in which the fold line is raised up so that the areas on each side collapse together under it, rather like an open book resting face-down on a table closes when it is lifted up by the spine. However, most people think in terms of picking up an edge or corner and folding it over, not in reaching for a central fold-line and lifting it up while allowing the edges to drag across the ground toward the middle.

It would be preferable to provide a mat which is portable by being dramatically more compact in folded states and yet which maintains a top surface which is clean, with no transfer of dirty from the bottom to the top surface during storage.

It would be preferable as well to provide a mat which then remains folded without the use of ties or the like, by avoiding the use of foam material in the hinges, and the use of a flexible hinge material.

It would further be preferable to provide a mat which easily folds into a small and thinner package. This further would allow storing in a small bag as a compact package rather than as a large bundle. Folded down smaller, it becomes more useful for other scenarios as well, fitting into car cargo nets, handbags, glove boxes, smaller backpacks and so on.

It would further be preferable to provide a mat which can be made in either of two ways: either with a flexible base layer with attached panels of hard material or in a single material unibody construction molded of a single material without a substrate.

It would further be preferable to provide a mat with easy one handed folding and unfolding methods of use. It would even further be preferable to provide a mat with an easy to use hand grip/hand hold to not just allow the user to fold it one handed but to furthermore automatically start the user into the proper fold sequence.

It would yet further be preferable to provide a mat which may be reused over and over again without cleaning, due to the top surface remaining clean and out of contact with the bottom surface.

It would further be preferable to provide a mat which uses the beneficial properties of rubber, EPDM rubber (ethylene propylene diene monomer (M-class) synthetic rubber), neoprene or similar harder materials which for a given thickness provide enhanced comfort, and durability. It would further be preferable to use these materials which are water-proof rather than merely water resistant (most foams are only water-resistant and can be difficult to clean when saturated and can take a surprising amount of time to dry).

It would further be preferable to provide a mat for which a bottom surface tread pattern may be used to increase traction on snow, ice, mud and similar surfaces.

It would yet further be preferable to have a thinner, denser mat so that when laid out it is less susceptible to wind, as foam mats, being very light, low density, and high profile, blow away extremely easily.

SUMMARY OF THE INVENTION

To provide a mat which keeps itself clean and yet is extremely portable, even folding up to 1/10 of open size (10% of unfolded size) the present invention teaches a combination of nine (or other squared number) upper surface panels of hard neoprene or EPDM rubber, a bottom surface/substrate holding the mat together which is very durable rubber-based material such as EPDM rubber or fabric—either the same material as the panel, or a different material—as well as a formula for placement of the panels with mathematically determined separations upon the substrate, a specific folding sequence, and a mud-flap—a projecting panel which appears awkwardly out of place given the regular pattern of the panels but which actually completes the folding sequence with every bottom surface covered by another bottom surface and no top panel in contact with any bottom surface. The use of a single material is advantageous for ease of manufacturing, since it can be molded with separations or molded and then separations of different widths can be machined across it, while the use of a different material for the panels and substrate allows a variety of different characteristics and optimization for cost, size, weight, comfort, use of recycled materials and so on.

In contrast to some foldable mats, the present mat teaches that the panels provide the cushioning effect.

The material of the panels of the invention may be a rubber, especially a high hardness neoprene, or EPDM rubber, or a plastic.

The present invention teaches a foldable portable mat for any outdoor use, work or sport or household use, in which the mat folds rather than rolls and folds so that the clean upper surface parts of the mat face only other clean upper surface parts of the mat, never dirty lower surface parts of the mat. However, unlike previous folding mats which fold dirty-to-dirty sides, the present mat does not require a pair of counter-intuitive book folds to do from the center fold, but rather and obvious corner grip and a carefully selected fold sequence, with structure enabling the proper folding, to achieve a fold ratio of 10:1 or more rather than 4:1 or so. By this means a user may unfold the mat and place it on the ground, stand on the mat to change athletic footgear or equipment or garden—thus getting the bottom surface of the mat dirty with dirt, mud, snow, ice, etc—refold the mat, and yet, when the user next opens the mat, the upper surface is still clean, having never come into contact with the lower surface. Obviously the mat may be used by skiers, hikers, bikers, skaters, rangers, loggers, gardeners, emergency crews, vehicle repair personnel or anyone else whose work or play requires them to be outdoors with footwear or other clothing such as biking clothing, skiing clothing and so on, which they may wish to change, or to be outdoors working underneath something, or working on the ground, etc. The device can be used for sitting while doing these things. One typical example is skiers, whose ski boots are so incredibly awkward that driving is impossible, so in a ski area parking lot skiers have no choice but to change footgear.

The present invention teaches that the mat of the invention's formula for placement and size of the gaps between panels in turn allows a method of folding so that the desired "clean to clean" and "dirty to dirty" side folding is always done.

The mat of the present invention may be easily folded and unfolded one handed, and yet keep the clean and dirty sides apart.

The invention may have a folding handhold as well, placed so as to direct the user's efforts toward the proper folding sequence, and indicia to indicate the proper folding, etc. The handhold may additionally allow easier folding by providing leverage and by allowing the user to maintain the proper wrist orientation.

The present invention further teaches a mathematical formulation for the panels and separations to support the desirable folding sequence.

It is therefore one aspect, advantage, objective and embodiment of the present invention, in addition to those described above, to provide a mat, the mat comprising:

an array of nine panels of a resilient cushioning material arranged in a rectilinear pattern of three rows by three columns, the panels having a uniform width and uniform length, the panels not directly connected to one another, the array of nine panels having at least a first corner and a second corner, the second corner diagonally distal from the first corner, each panel having a thickness X; a mud-flap, dimensioned and configured to match a single panel of the array and disposed adjacent to a panel at the corner of the array; the array of nine panels and the mud-flap connected to one another by a flexible backing comprising a base layer providing separations between each panel and all other panels and the mud-flap, with a total of five separations, the mat having a top surface defined by the array of nine panels and the mud-flap and having a bottom surface comprising the flexible backing material; a first one of the separations being between a first and a second row and a second one of the separations being between the second and a third row; a third separation between a first and a second column and a fourth separation between the second and a third column; a fifth separation between the mud-flap and the corner; each separation having a width which is a multiple of the panel thickness X, wherein the separation widths are defined as follows: the first separation width being 2X, the third separation width being 6X, the fourth separation width being 4X, and the second and fifth separations being greater than zero.

It is therefore a second aspect, advantage, objective and embodiment of the present invention, in addition to those described above, to provide a mat, further comprising: indicia upon the top surface, indicating that a first valley fold should be made at the first separation, a second mountain fold should be made at the second separation, a third valley fold should be made at the third separation, a fourth mountain fold should be made at the fourth separation, and a fifth mountain fold/book fold should be made at the fifth separation.

It is therefore another aspect, advantage, objective and embodiment of the present invention, in addition to those described above, to provide a mat, further comprising: a handhold disposed at the second corner.

It is therefore another aspect, advantage, objective and embodiment of the present invention, in addition to those described above, to provide a mat, wherein the panels further comprise a neoprene material having a durometer hardness of at least 80.

It is therefore another aspect, advantage, objective and embodiment of the present invention, in addition to those described above, to provide a mat, wherein the flexible backing material is one member selected from the group consisting of: the same material as the panels, a different material from the panels, and combinations thereof.

It is therefore another aspect, advantage, objective and embodiment of the present invention, in addition to those described above, to provide a mat, wherein the flexible backing material is one member selected from the group consisting of: nylon, polyester, and combinations thereof.

It is therefore another aspect, advantage, objective and embodiment of the present invention, in addition to those described above, to provide a method of folding the mat from an open position, the method comprising the steps of: carrying out a valley fold at the first separation; doing a mountain fold along the second separation; doing a valley fold at the third separation; doing a mountain fold at the fourth separation; and doing a book fold at the fifth separation; whereby the entire mat is folded with the bottom surface entirely facing other parts of the bottom surface and no part of the top surface facing any part of the bottom surface, and due to the folding the mat is the uniform length and uniform width of a single panel and has a thickness of 10X.

It is therefore yet another aspect, advantage, objective and embodiment of the present invention, in addition to those described above, to provide a mat, wherein each panel comprises: a square shape, whereby the uniform length and the uniform width are the same.

In embodiments, the length and width may be different, so that the mat is composed of rectangular panels and thus a larger surface area in one dimension may be achieved.

It is therefore yet another aspect, advantage, objective and embodiment of the present invention, in addition to those described above, to provide a mat, wherein each panel has rounded corners.

It is therefore yet another aspect, advantage, objective and embodiment of the present invention, in addition to those described above, to provide a mat, wherein the bottom surface further comprises a traction aid.

It is therefore yet another aspect, advantage, objective and embodiment of the present invention, in addition to those described above, to provide a mat, wherein the traction aid comprises one member selected from the group consisting of: multiple cross-shaped protrusions, multiple circular protrusions, multiple toroidal protrusions, a roughened area, and combinations thereof.

It is therefore yet another aspect, advantage, objective and embodiment of the present invention, in addition to those described above, to provide a mat, the mat comprising: a resilient material having an array of nine raised panels of uniform length and width, arranged in a rectilinear pattern of three rows by three columns, each panel having a thickness X, the nine panels connected to one another by the resilient material; separations between the panels, with a total of at least four separations, the mat having a top surface defined by the array of nine panels and having a bottom surface comprising the resilient material; a first separation between a first and second row and a second separation between the second and a third row; a third separation between a first and second column and a fourth separation between the second and a third column.

It is therefore yet another aspect, advantage, objective and embodiment of the present invention, in addition to those described above, to provide a mat, each separation having a width, wherein the separation widths are defined as follows: the first separation width being 2X, the second separation being approximately zero, the third separation width being 6X, the fourth separation width being 4X.

It is worth noting that the zero width separations are actually of course slightly larger than zero, since nothing is truly of zero width, and the edges of the panels may be irregular, as well testing revealing that slightly larger gaps then zero allow for easier folding and flatter configuration when open. Thus the terms "greater than zero" and "approximately zero" may refer to dimensions from 2X down to zero.

It is therefore yet another aspect, advantage, objective and embodiment of the present invention, in addition to those described above, to provide a method of folding the mat an open position, the method comprising the steps of: carrying out a valley fold at the first separation; doing a mountain fold along the second separation; doing a valley fold at the third separation; and doing a mountain fold at the fourth separation; whereby the entire mat is folded with no part of the top surface facing any part of the bottom surface and the mat is the length and width of a single panel and is the thickness of nine panels.

It is therefore yet another aspect, advantage, objective and embodiment of the present invention, in addition to those described above, to provide a mat, further comprising: indicia upon the top surface, indicating that a first valley fold should be made at the first separation, a second mountain fold should be made at the second separation, a third valley fold should be made at the third separation, and a fourth mountain fold should be made at the fourth separation.

It is therefore yet another aspect, advantage, objective and embodiment of the present invention, in addition to those described above, to provide a mat, further comprising: a handhold disposed at a first corner.

It is therefore yet another aspect, advantage, objective and embodiment of the present invention, in addition to those described above, to provide a mat, wherein the handhold comprises: a hole passing through the mat; a cord passing through the grommet and secured thereto; a grip secured to the cord.

It is therefore yet another aspect, advantage, objective and embodiment of the present invention, in addition to those described above, to provide a mat, wherein the handhold comprises: a grommet in the hole.

It is therefore yet another aspect, advantage, objective and embodiment of the present invention, in addition to those described above, to provide a mat, wherein the bottom surface further comprises a traction aid.

It is therefore yet another aspect, advantage, objective and embodiment of the present invention, in addition to those described above, to provide a mat, wherein the traction aid comprises one member selected from the group consisting of: multiple cross-shaped protrusions, multiple circular protrusions, multiple toroidal protrusions, a roughened area, and combinations thereof.

It is therefore yet another aspect, advantage, objective and embodiment of the present invention, in addition to those described above, to provide a mat, wherein the traction aid on a first panel has a different location than the traction aid on a second panel, whereby when the two panels are folded together, the traction aids do not impact one another and the thickness of the folded mat is increased by only the thickness of a single traction aid, not double the thickness of the traction aid.

BRIEF DESCRIPTION OF THE DRAWINGS

FIG. 7 is a table of dimensions of the formula for separation distances.

FIG. 19 is a planform view of a presently preferred embodiment and best mode now contemplated for carrying out the invention, showing a different indicia marking, rounded corners, a small hole with an extra grip, advertising material and so on.

INDEX OF REFERENCE NUMERALS

Figure 1:
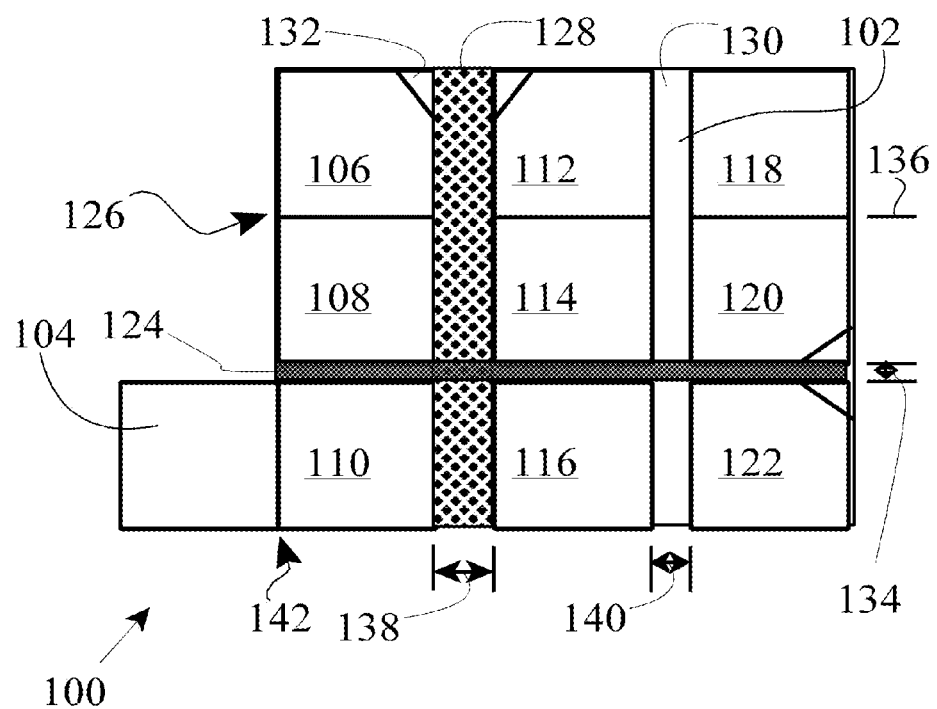
FIG. 1 is a top view of a folding mat according to a first embodiment of the present invention, showing the defined measurements in accordance with the formula.

Clean fold athletic mat 100
Foldable backing material 102
Mud-flap/optionally 10th panel 104
First panel 106
Second panel 108
Third panel (adjacent mud-flap) 110
Fourth panel 112
Fifth (center) panel 114
Sixth panel 116
Seventh panel (lift panel) 118
Eighth panel 120
Ninth panel 122
First separation (first valley fold) 124
Second separation (first mountain fold) 126
Third separation (second valley fold) 128
Fourth separation (second valley fold) 130
Fold indicia 132
First separation distance 134
Second separation distance (zero to 2X) 136
Third separation distance 138
Fourth separation distance 140
Mud flap separation/distance 142
Grommet (optional) 144
First fold indicator 146
Handhold 148
Mud-flap back fold 150
Stack of panels folded 152
Top side 160
Bottom side 170
Re-usably clean fold mat 200
First panel 206
Second panel 208
Third panel (adjacent mud-flap) 210
Fourth panel 212
Fifth (center) panel 214
Sixth panel 216
Seventh panel (lift panel) 218
Eighth panel 220
Ninth panel 222
First separation (first valley fold) 224
Second separation (first mountain fold) 226
Third separation (second valley fold) 228

Fourth separation (second valley fold) 230
Fold indicia 232
First separation distance 234
Second separation distance 236
Third separation distance 238
Fourth separation distance 240
Panel 1000
Tread unit (cross shape) 1004
Panel 1100
Rounded panel corner 1102
Tread unit (bump) 1104
Flat top of bump 1106
Panel 1200
Tread unit (circular) 1204
Depression in center of circle
Corrugation/roughed surface 1308
Panels (disconnected during prod) 1532*a-j*
Base layer 1630
Base layer 1730
Panels in place on layer 1734
Base layer with holes 1830
Hole (smaller than panel) 1836
Invention complete 1900
Rounded interior base corner 1940
Rounded panel corner 1942
Hole (optional grommet) 1946
Preferred indicia 1947
Extra grip 1948
Advertising/trade name 1949
Invention (orthog view) 2000
Thickness difference 2050
Unibody/single molded unit 2160
Uniform panel width 2162
Uniform panel length 2164
Cord 2170
Grip body 2172

DETAILED DESCRIPTION

Glossary

A "mountain" fold as used herein has the ordinary paper-folding meaning of a fold in which the line of folding comes upward, while a "valley" fold refers to a fold in which the line of folding goes downward. A "panel" as used herein refers to a body, of any shape, which is resilient, cushioning, and offers traction through its resilience and cushioning, and which is arrayed with other panels which it may or may not be connected directly. Thus an ordinary tarp material or the like is not a panel, as it lacks any cushioning or resiliency.

A "book" fold may be regarded as a special type of mountain fold: an entire large body is elevated at a central fold line while the edges of the body drag inward until they meet. This type of fold may be counter-intuitive in the prior art applications, since human beings tend to grasp large objects by an edge or corner and since these application begin with mountain folds of the entire opened mat. However, in the present invention the user completes all other folds before doing a book fold of the mudflap only, at which point folding that flap under is instantly obvious. (This is because the mudflap separation distance (nominal zero, actually 2X or less) is insufficient to allow to fold the wrong away onto the top of the entire stack of other panels.)

A toroid is a "doughnut shape": a ring.

End Glossary

The mat of the invention may be made by any of a variety of methods: molding of a single piece with the separations present in the mold as narrower voids, bonding of panels to a substrate, machining of separations into an integral piece, etc. In the presently preferred embodiments, as discussed below, a hard material is used for the 9 or 10 (or more if they are different shapes and sizes, such as two triangles in place of a single rectangle) panels, while a very thin flexible material is used for the base layer/substrate/flexible backing.

It is therefore a preferred embodiment and best mode now contemplated for carrying out the invention to provide a folding mat in which all top side or clean side portions fold against other top/clean side portions and all bottom/dirty side portions fold into other bottom/dirty portions, and yet the folding may be done one handed, without a book fold until the very final step, and yet a high ratio of open to folded size is allowed. In fact, in the present invention the final folded form of the mat is the size (length and width) of only a single panel of the mat.

FIG. 1 is a top view of a folding mat according to a first embodiment of the present invention, showing the defined measurements in accordance with the formula. Clean fold athletic mat 100 may have in embodiments a foldable backing material 102 which is designed for strength and durability as well as flexibility. However, this backing material 102 is not selected for cushioning or tread effect, unlike the prior art, since it may be a different material from the panels. In other embodiments, the panel material may be grooved or incised to create separations and thus define panels on the surface of the mat, with the mat being a single integral unit of the same material. Either way is possible. The first method offers the ability to use a material on the bottom surface, the substrate, designed for toughness, which connects the panels. The second method of construction (an integral unit grooved to create panels) offers ease of manufacturing. At the present time, the first method is no longer preferred, even though it provides noticeably tougher construction, and is much more compact, water-proof and easy to clean compared to foam mats of the prior art. Rather, the second method is preferred, as it is simpler to construct, has a very clean finish, and is very durable being made out of a single large piece of high-strength rubber or rubber-like material.

The cushioning and traction panels of the pad are made of a resilient material such as neoprene or EPDM rubber (the present preference). Note that EPDM or hard neoprene (in the best mode, durometer hardness approximately 80 or more is used) are candidate materials for a portable mat to serve as the panel material, even though these materials are stiff, too stiff (even in quite thin applications) to easily roll or fold if it is a uniform thickness unless some special provision is invented for dealing with this. In one embodiment which is presently preferred, the thickness of the neoprene/EPDM may be 2 mm. Even at this thickness the material becomes surprisingly stiff in use, so in the integral construction embodiments (lacking a separate substrate material) have separations between the panels which are grooves or valleys in the material, the separations having widths which are carefully chosen in accordance with the formulation presented below. The material of the pads may also be alternative materials such as wood, bamboo, composite, bamboo weaving and so on.

The thickness of the panels of traction material is important in another way to the invention. In particular, the folding pattern, and irregular panel configuration, combined with proper separation distances between the panels and the proper method of folding, allow the invention to maintain the clean-to-clean and dirty-to-dirty folded rule. Thus, for purposes of this application the term "X" is used to denote the thickness of the panels and the distances between are then defined in multiples of X, such as 2X, 4X, etc.

Mud-flap/optional 10th panel 104 is noticeable as it violates the orderly array of the panel layout. However, this oddball panel is presently preferred for the same reasons: allowing a complete covering of all dirty surfaces (of the substrate 102 if a substrate embodiment is used, or the bottom/dirty side of the integral construction mode) with other dirty parts of substrate 102 or integral body embodiments with no substrate material—this also provides additional clean area for the user to sit/stand upon. The mud-flap 104 may be the same size as the other panels, and may be the same shape, but may also be omitted, or may be larger, smaller, a different shape, etc. The mud-flap 104 may incorporate a carrying device like a bag, straps, etc. The mud-flap 104 may even be a different material or color than the other panels. Note that the mud-flap 104 also provides a convenient and eye-catching place for the printing of advertising material or logos.

It is important to note that the mud-flap also provides the invention with a very distinctive, even unique, look when compared to prior art mats.

The array of panels comprise first panel 106, second panel 108, third panel 110 (which is adjacent to mud-flap 104), then in a new column fourth panel 112, fifth (center) panel 114, sixth panel 116 and in the final row the lift panel which the user may grasp, for example by means of an optional handhold, designated here as seventh panel 118, and eighth panel 120 and finally ninth panel 122. In embodiments the panels may be square, however, in other embodiments the panels may be other shapes, such as rectangles, triangles (if paired to make rectangular panels anyway), etc, or any other shape/size combination allowing easy folding. Square or rectangular panels are presently preferred, for although they require the use of the separation distance formulation presented later, they also efficiently fill up space with cushioning traction material atop the mat and the shape is easy to manufacture.

Note that the panels have a uniform length and width, and if fact the final folded size of the mat will be the size of one panel.

The separations may be seen to form an irregular "tic-tac-toe" pattern or "pound sign" or "hashtag" with the separations being of different widths in order to force compliance (and allow compliance) with the clean folding method aspect of the invention. Thus the first separation (which corresponds to the first valley fold) 124 is a different width than the second separation (first mountain fold) 126 (which can be zero to 2X width, since it is a mountain fold with no sandwiched panels therebetween), and so on. At the present time, the preferred zero separation is in fact also 2X, as this is easy to fold, easy to flatten, and easy to manufacture.

The separations may be formed in "substrate" embodiments simply by affixing the panels of the mat to the substrate with the separations between the panels' edges. The separations may be formed in "integral" embodiments (lacking a separate substrate) simply by incising, molding, grooving, cutting, etc the separations into a single large integral body of the material, thus forming the panels, but once again requiring careful sizing of the separations.

Third separation (second valley fold) 128 and fourth separation (second valley fold) 130 may be seen to be perpendicular to the first and second gaps 124/126.

Figure 19:
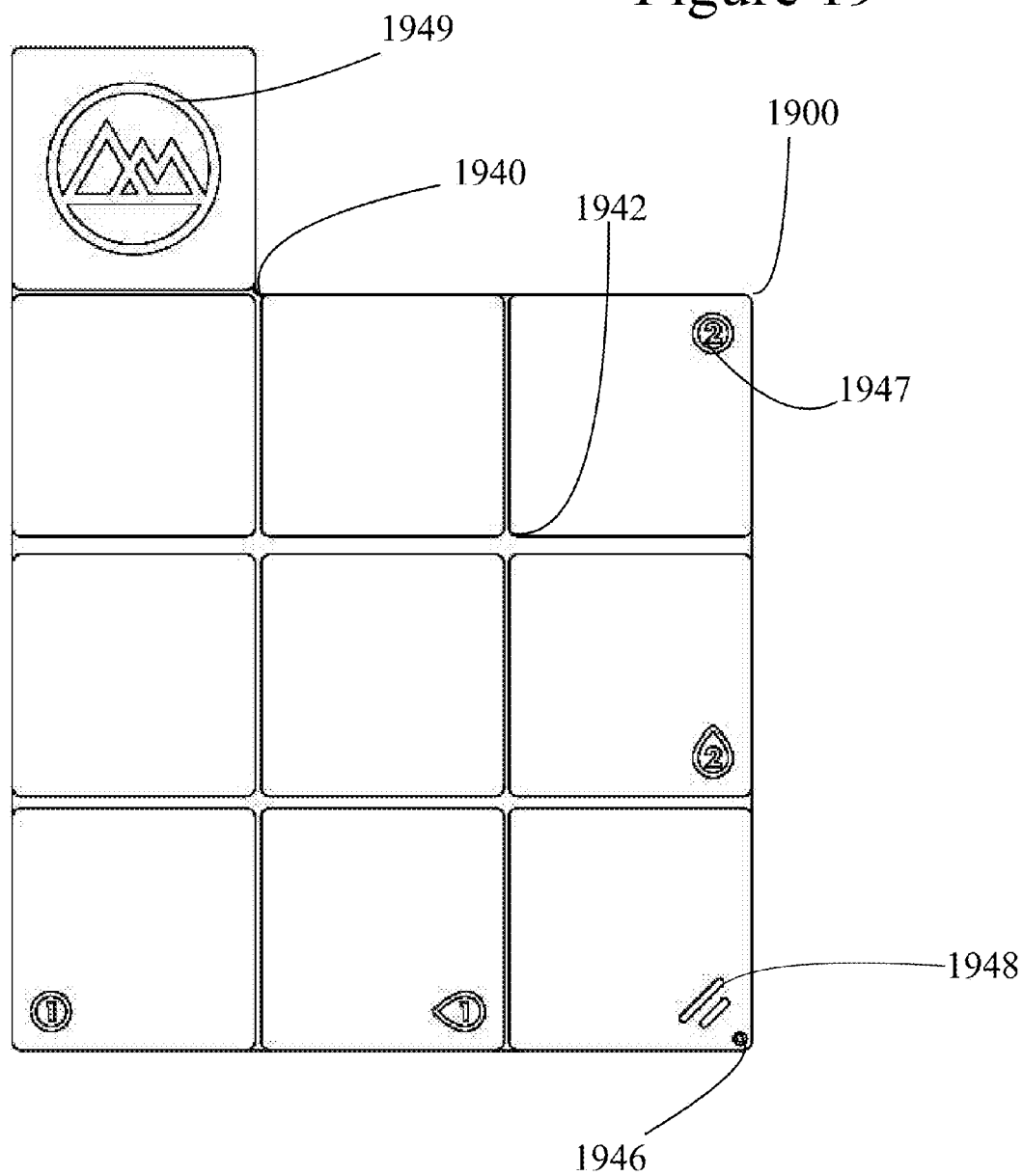

Fold indicia 132 may be provided. While the indicia shown are depicted as four triangles marking the two valley folds, instructions may be printed, there may be color coding, other shapes, arrows and so on may be employed within the scope of the invention. A more preferred indicia embodiment is shown in FIG. 19.

First separation distance 134 may advantageously be 2X. Thus in an embodiment having 2 mm thick panels, the first separation distance 134 may be 4 mm.

Second separation distance 136, as noted previously may be zero (ie up to 2X).

Third separation distance 138 is considerably larger, as a group of panels must be sandwiched by the fold, so it is 6X, for example, 12 mm separation for a 2 mm panel thickness embodiment.

Fourth separation distance 140 may be 4X, due to having fewer panels to fold, in turn due to being a mountain fold. It will be seen that the number of folds previously made and the mountain versus valley fold distinction will determine thicknesses, as will the number of panels (more than 9 regular panels may be used), the shapes used (very small circular panels will allow avoidance of the formulation, with enormous curving separations and the panels offering only a small padded surface area in small round patches) and so on.

Mud flap separation/distance 142 may be much less than 2X, and in fact hypothetically as small zero since the mud-flap is a back fold (a mountain fold) to the rear of the stack of panels, which is carried out after all regular folding is completed. Note that this is a book fold, which the invention otherwise avoids, however as at this point in the procedure the mud flap is the only panel left out of the stack, and as the mud flap only folds this one direction, this fold is actually not counter-intuitive in this case.

Note that these distances may all be adjusted upward, that is, the distances given such as 6X, zero, etc, are all minimums. A mat with different sizes and shapes of panels might well have very large distances therebetween. For purposes of clarity in this application, the thickness of the flexible backing material may be ignored. In the case of the "zero" distance used herein, a notation has frequently been made that this is a minimum, for a number of reasons, one of which is the thickness of the backing material.

Figure 2:
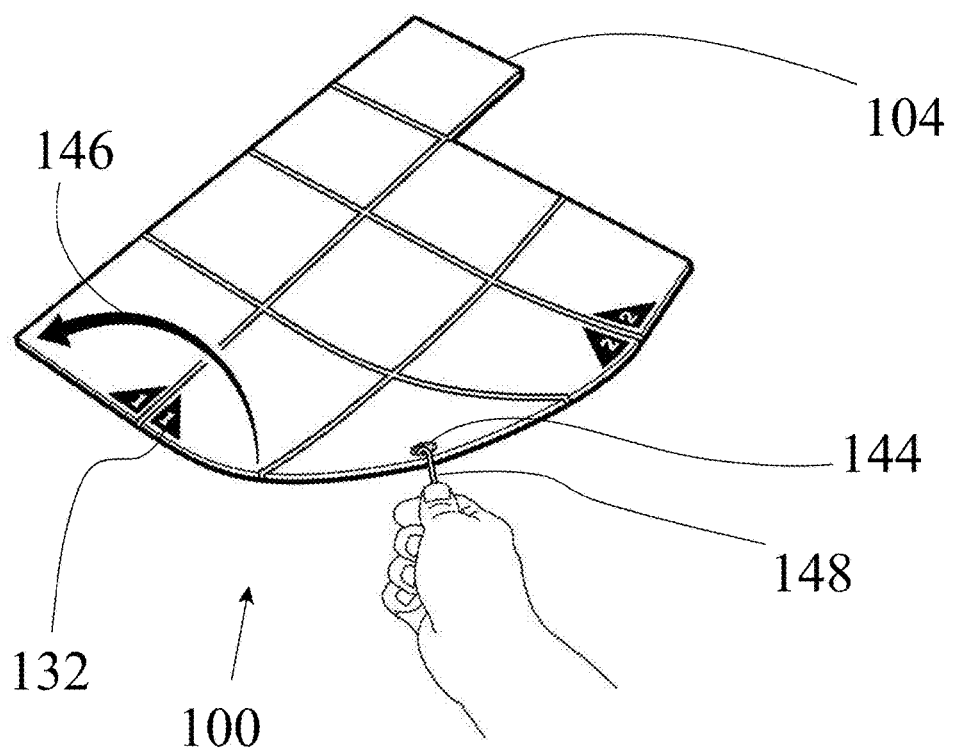
FIG. 2 is an elevated oblique view of a folding mat according to a second embodiment of the invention, about to be folded.

FIG. 2 is an elevated oblique view of a folding mat according to a second embodiment of the invention, about to be folded. Grommet or reinforced hole (reinforcing may be molded into the shape) 144 has handhold 148, which may be called a "zip pull". (This does not refer to any zipper.) The user may grasp the handhold 148 one handed (which may be any of a wide range of different mechanisms, such as a loop of parachute cord or other cord/rope, a knob, a handle, a grip, a flap, etc). Having the user grip the handhold 148 causes the user to properly orient the mat and to furthermore begin by lifting the mat by a mat part conducive to proper folding method. In addition, the cord allows the user to keep their wrist in a comfortable orientation for the fold, and also provides a bit of leverage for the operations of folding. User testing has shown that folding the mat is an engaging experience which provides a mild sense of mastery.

First fold indicator 146 shows the nature of the first fold, over the first separation, so that one row of panels will face another row of panels, clean face to clean face. Note that one hand is the natural method of creating this fold.

Figure 3:
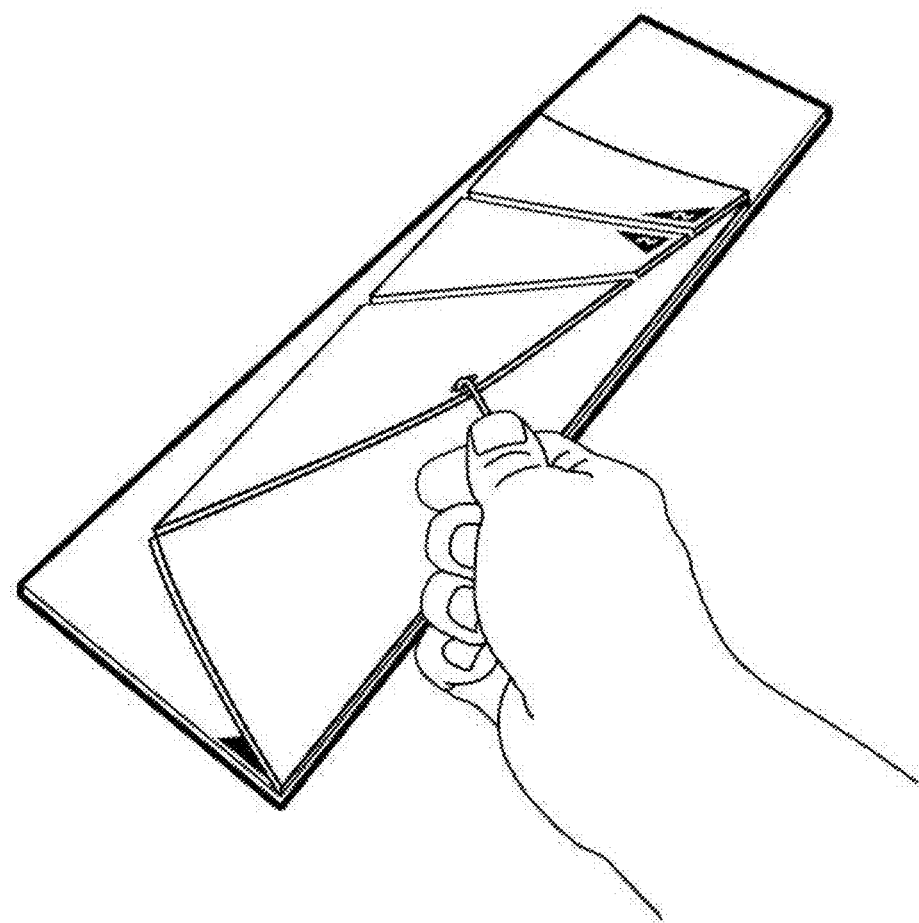
FIG. 3 is an elevated oblique view of a folding mat according to a second embodiment of the invention, with the first pair of folds almost completed.

FIG. 3 is an elevated oblique view of a folding mat according to the second embodiment of the invention, with the first pair of folds almost completed: the mat has been valley folded along the first separation and mountain folded along the second to make a long stack, three panels deep and three long, with the mud-flap panel protruding from one end. The user has not had to shift their handhold and is still doing each fold in obvious sequence with a single hand. Every fold is "clean to clean" and "dirty to dirty" on each panel of the mat, upper or lower surface. This is part of a unique one handed folding and unfolding operation which is not only easy but leads to clean hands for the user: the user never has to touch the dirty bottom side of the mat.

In fact, unlike prior art mats which are basically a series of book folds, the user does not even have to grasp the mat by the edges, which while dirty is the instinctual method of carrying out the book folds of the prior art.

Further note that after two book folds of the prior art, a prior art mat is ¼ of unfolded size, but after a series of ⅓ folds of the present mat it is in fact ¹/₁₀ of original size and can easily fit in a small pouch.

Figure 4:
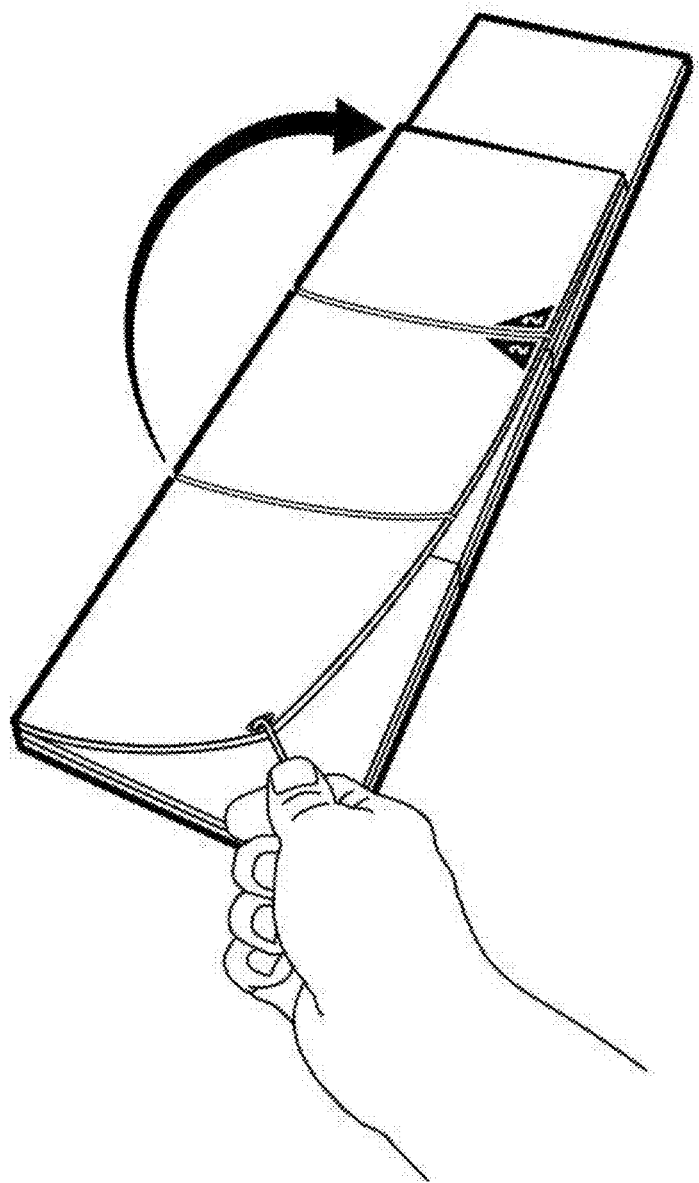
FIG. 4 is an elevated oblique view of a folding mat according to a second embodiment of the invention, with the second pair of folds about to begin.

FIG. 4 is an elevated oblique view of a folding mat according to the second embodiment of the invention, with the second pair of folds about to begin. The user is lifting the mat, still by the hand hold, to make a new valley fold between the first and second stacks of panels. It may be seen that the separation distance is thus 6X: two stacks of three panels each must fold together. Once again, the clean faces are meeting other clean faces and dirty portions meet other dirty portions.

Figure 5:
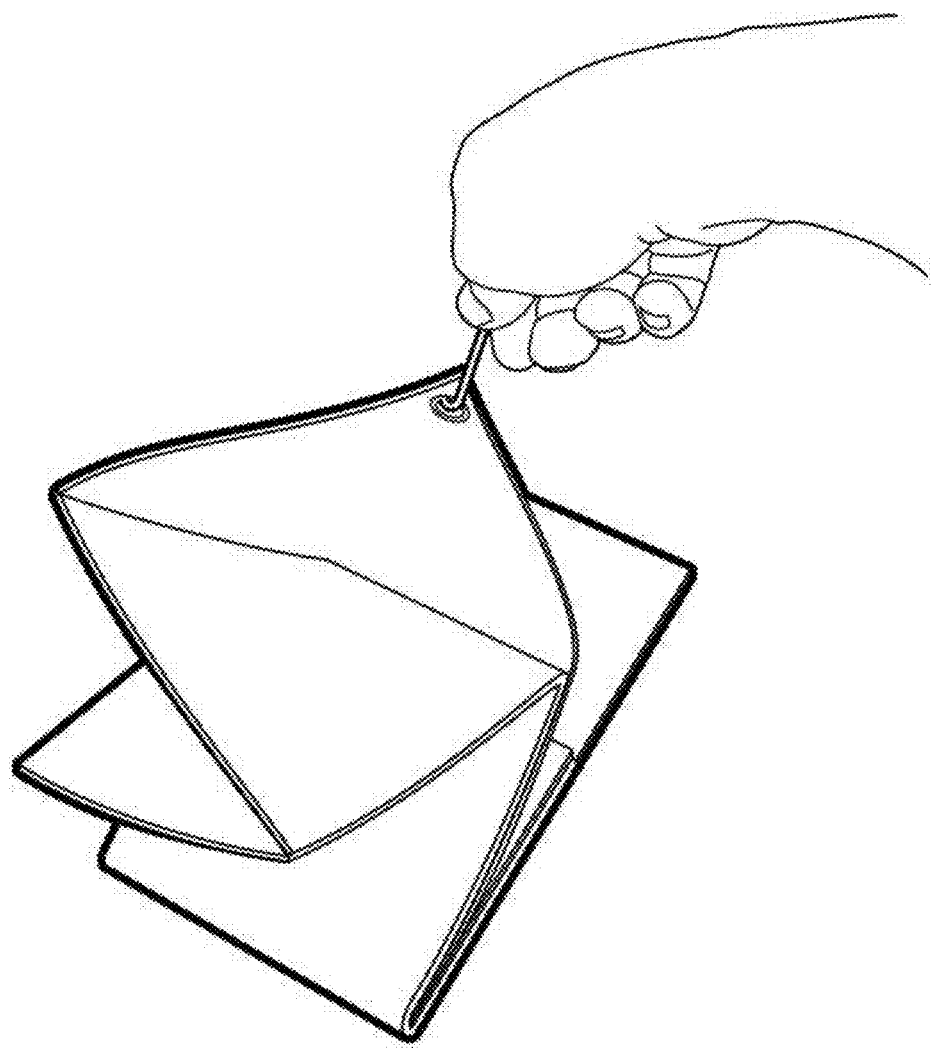
FIG. 5 is an elevated oblique view of a folding mat according to a second embodiment of the invention, with the second pair of folds almost finished.

FIG. 5 is an elevated oblique view of a folding mat according to a second embodiment of the invention, with the second pair of folds almost finished. It may be seen that a single stack of nine panels is now created. Thus in embodiments, it is preferred though not mandatory that panels be uniform shape and size.

Up to this point, the user will have felt disinclined to use their other hand for any purpose: the folding simply proceeds more easily as a series of onehanded flips using the handhold.

Figure 6:
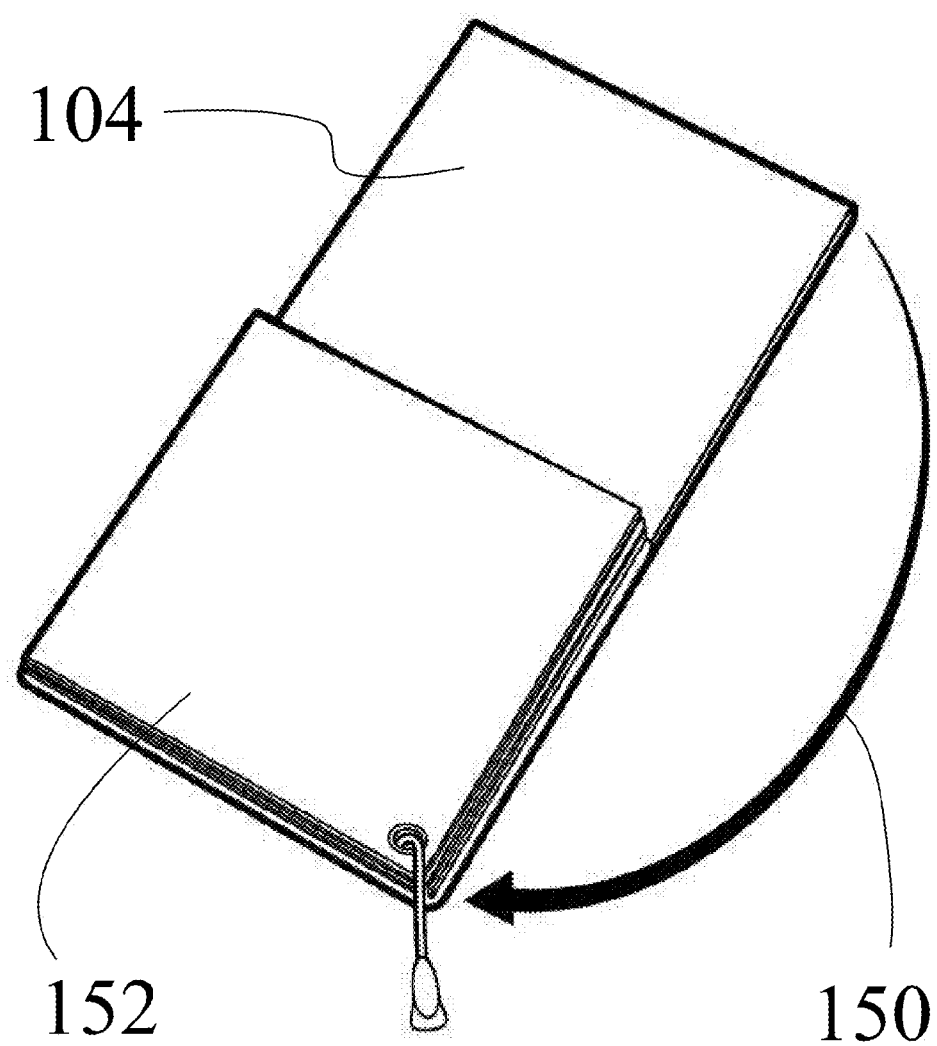
FIG. 6 is an elevated oblique view of a folding mat according to a second embodiment of the invention, with the mud flap panel about to be folded to complete to folding, leaving no dirty surfaces exposed.

FIG. 6 is an elevated oblique view of a folding mat according to the second embodiment of the invention, with the mud flap panel about to be folded back 150 to complete the folding, leaving no dirty surfaces exposed. A tidy stack 152 of 10 panels is thus created, with two clean faces exposed, one on each side, and with all dirty faces confined against other dirty faces and not visible, and thus not free to easily drop dirt.

After this, the mat may be stored by being put into a pouch, a pocket, a vehicle etc. Note that the mat will not dirty what it contacts since it has two clean panels (panel 110 and the mudflap) facing out. This contributes to the "clean reusability" of the mat, since it will not be dirtying the pouch and then itself indirectly. When the user next reverses the folding sequence and unfolds the mat, the top surface will still be clean, over and over again. This is in sharp contrast to rolled up mats or mats which fold clean to dirty parts, while the ¹/₁₀ fold ratio is a contrast to the ¼ fold ratio of prior art mats using book folds.

FIG. 7 is a table showing the various dimensions and details of the folds and separations. It will be seen that each fold has a multiple ("4X" for example) which depends upon whether it is a mountain or valley fold, the number of folds before, part of the array folded and so on.

Figure 8:
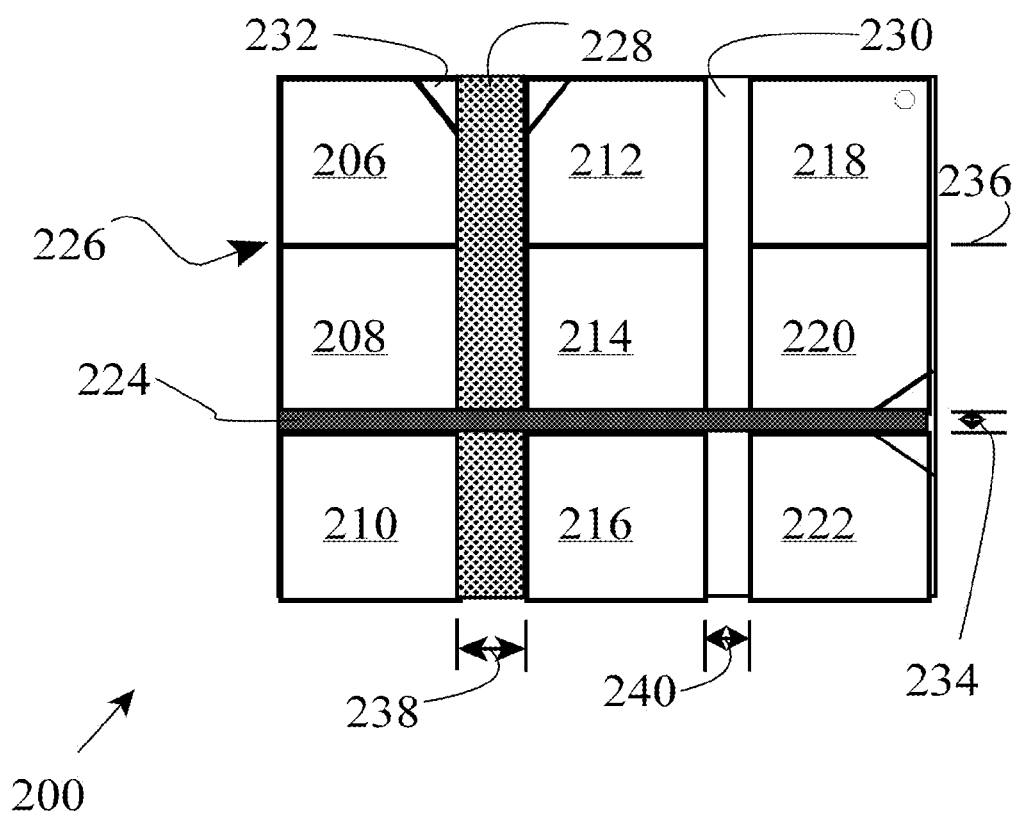
FIG. 8 is a top view of an alternative embodiment lacking a mud flap, showing the defined measurements in accordance with the formula.

FIG. 8 is a top view of an alternative embodiment lacking a mud flap, showing the defined measurements in accordance with the formula. Clean fold athletic mat 200 has foldable backing material 202, first through ninth panels 206, 208, 210, 212, 214, 216, 218, 220 and 222, but not a mud-flap tenth panel. It further has first through fourth separations 224, 226, 228, and 230, but has no fifth separation since the mud-flap is omitted. Fold indicia 232 may be provided. The four separation distances 234, 236, 238, 240 of the four folds are also visible.

This embodiment has a pleasing symmetrical array, but lacking a mud-flap will leave on one side of the folded stack an exposed dirty face (to be precise, the part under panel 206). While the dirty face of the folded stack will not be in contact with any clean panel face, it will nonetheless be in view to the user, able to drop dirt and drying mud and so on. This embodiment, however, should be easier to manufacture.

Figure 9:
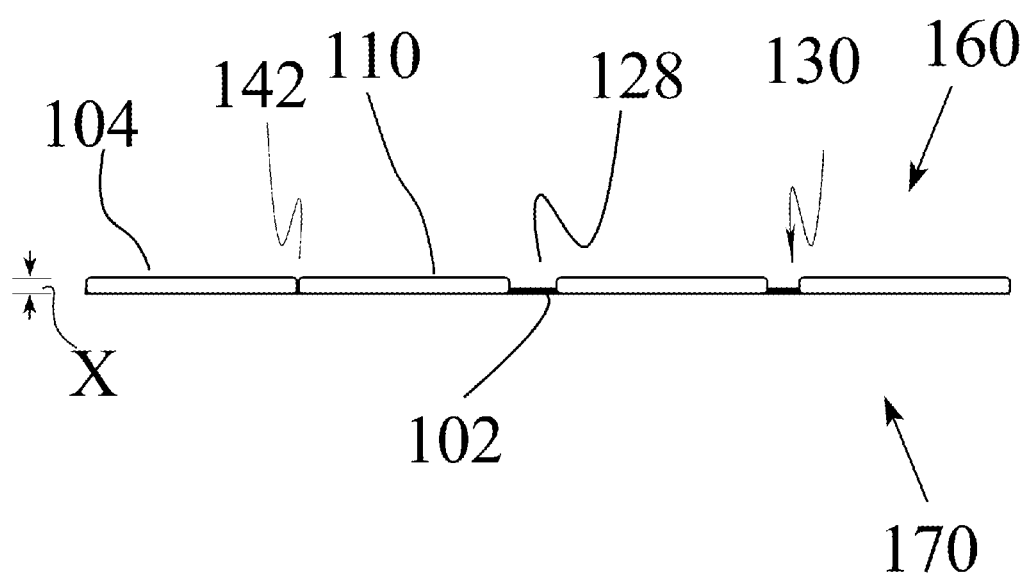
FIG. 9 is a side view of an embodiment showing the thickness of the panels which is used as the basis of the formula.

FIG. 9 is a side view of an embodiment showing the thickness of the panels which is used as the basis of the formula. The athletic mat has a visual length of four panels, due to mud-flap 104 projecting. Substrate 102, the flexible material which actually contacts the snow or ground, may be seen on the bottom of the mat, though it is most easily seen in the separations between panels. Panel 110 is marked for purposes of mental orientation when viewing the mat. Gap 142 between the panel 110 and the mud-flap 104 may be zero (or greater), as that is a back fold/mountain fold. Separations 128 and 130 may be seen (the third and fourth separations) and they may be easily seen to be different widths.

Importantly clean side 160 and dirty side 170 may be seen to be defined. The substrate 102 (in substrate embodiments, otherwise just the part of the same panel material which is ungrooved and forms the bottom surface) is the face/surface of the dirty side 170, which sits upon the ground, while the panels (and to a limited degree the separations) are uppermost when the unit is deployed, with the user's feet, socks, etc thereon: the clean side 160.

The mat of the invention may be stored in a water resistant pouch. Note that since the mat goes into the pouch, or another container, or simply a pocket, vehicle trunk, etc, with all clean sides exposed, the mat itself does not then dirty its environment: the interior of the pouch, a car seat, the user's hands, and so on. This aspect of the invention is very important to the overall ability of the invention to be used many times without cleaning and yet still have a clean side which remains clean and which does not require the user to handle the dirty side.

Figure 10:
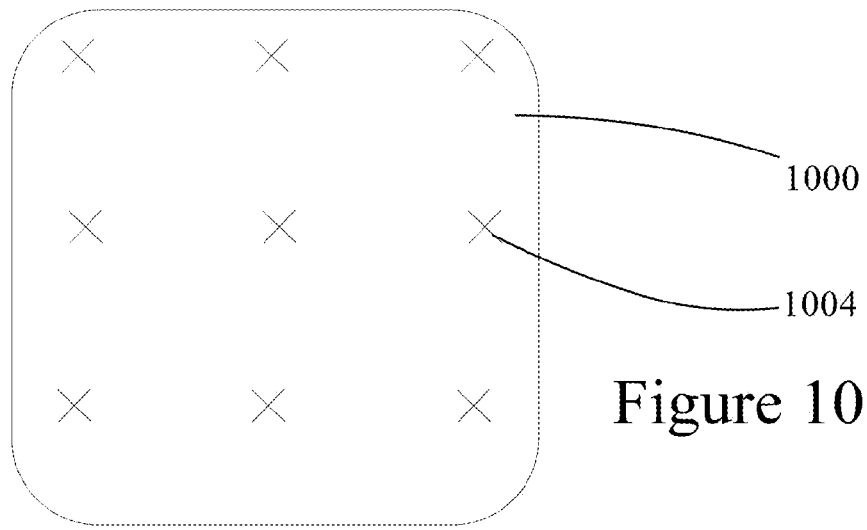
FIG. 10 is a bottom planform view of a single panel of the invention showing one potential traction enhancing tread pattern.
Figure 18:
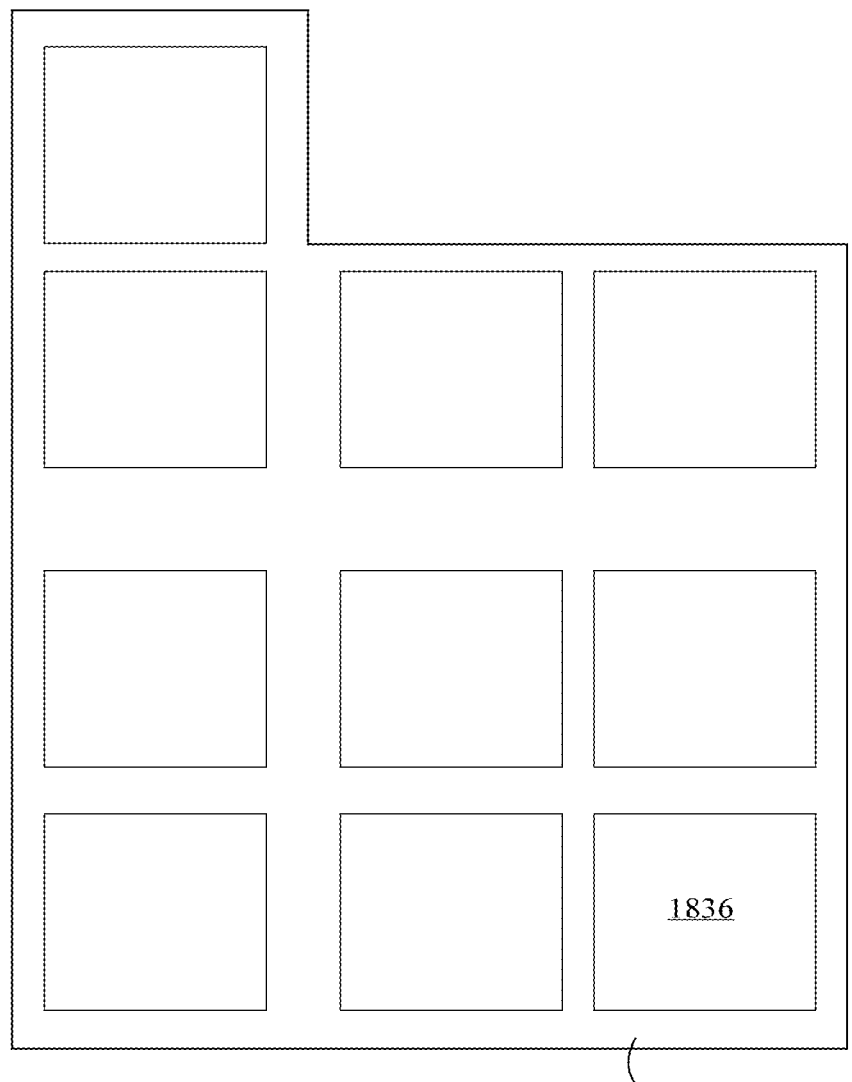
FIG. 18 is a planform view of an alternative embodiment of the base layer of the invention in which the base layer has holes corresponding to areas covered by the panels in any case (the squares shown are not panels but holes, each smaller than the panel which will cover the hole).

FIG. 10 is a bottom planform view of a single panel of the invention showing one potential traction enhancing tread pattern. Panel 1000 is shown from a bottom view. Thus this may be an embodiment as shown in FIG. 18 in which the flexible base layer has holes under the panels, or this panel may be on the top side of the base layer while the tread pattern shown is on the bottom, or this may be a unibody construction of a single layer. Regardless, tread unit 1004 has a cross shape. It will be understood that this is merely on potential embodiment of the tread unit designed to increase the friction/traction of the bottom of the mat with the surface below it: snow, ice, mud, gravel, etc.

Figure 11:
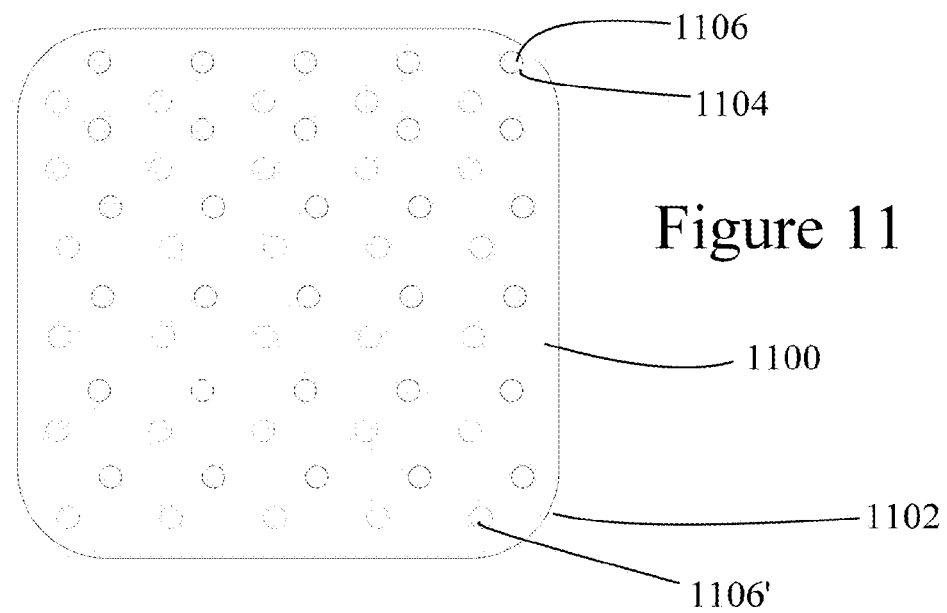
FIG. 11 is a bottom planform view of a single panel of the invention showing another potential traction enhancing tread pattern.

In both FIG. 10 and FIG. 11, it will be seen that the traction aid is offset from the edges of the panel, that is, it looks a bit "lopsided". However, this is a deliberate design choice. It may be seen that when two identical panels are adjacent, and are folded together, the traction aids will not impact one another but rather will be at different locations in the area between the two folded panels. This is most clearly seen in item 1106' versus 1106 of FIG. 11: 1106 is the tread pattern of the panel bottom, while 1106' shows the place where the tread pattern 1106 of a different, adjacent, panel will meet the bottom of this panel after folding. Since 1106 and 1106' are in different places, they do not double the thickness of the folded panels. FIG. 11 is a bottom planform view of a single panel of the invention showing another potential traction enhancing tread pattern. Panel 1100 has tread units 1104 having flat topped bumps or cleats as the traction aid. This shape may be as small as 1 mm tall with a 30 degree slope from a wider base to a narrower top. Since they are offset from being a symmetrical pattern about any axis of the panel 1100, the 1 mm height does not meet the 1 mm height of matching cleats on another panel when folded bottom to bottom.

Flat top to bump 1106' on the other hand may be seen to actually be the traction aid pattern from an adjoining and identical panel which has been folded, bottom surface to bottom surface, with panel 1100. The traction aids are different locations and thus do not double their thickness. For example, in one presently preferred embodiment, the traction aids might be a single millimeter in height. Folded as shown, only a single millimeter is created between the panels by the traction aids. If this was not provided, two millimeters would exist between the folded bottom surfaces. Remembering that the present mat is unique in folding to 10X of its original thickness, this means that 1 mm traction aids add only 3 mm to the package thickness instead of 6 mm.

Actually the degree of match may be even more specific than this, as in every case when the mat is folded properly, the identity of two panels which will fold bottom to bottom surfaces is known and these two panels may have complementary patterns of other types.

This panel may also have rounded corners 1102 to aid in folding and increase the lifespan of the flexible material by eliminating stress points created by corners.

Figure 12:
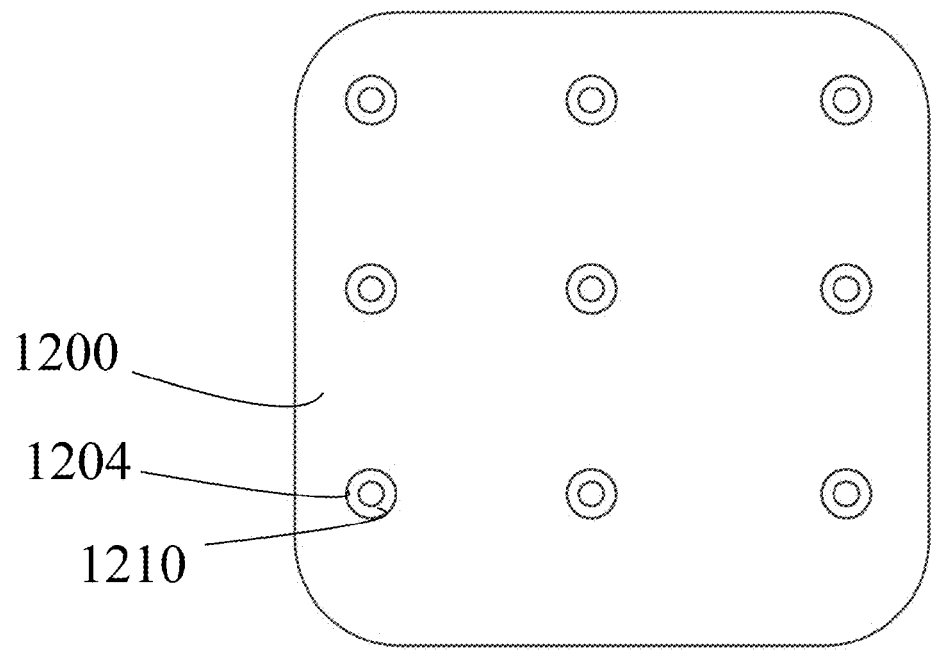
FIG. 12 is a bottom planform view of a single panel of the invention showing another potential traction enhancing tread pattern.

FIG. 12 is a bottom planform view of a single panel of the invention showing another potential traction enhancing tread pattern. Panel 1200 (or part of the bottom surface corresponding to a panel on the top surface of the base layer) may have a circular traction aid 1204. Unlike the cleats of FIG. 11, this may be toroidal or ring-shaped, with a small depression 1210 in the center of circular traction aid 1204.

Figure 13:
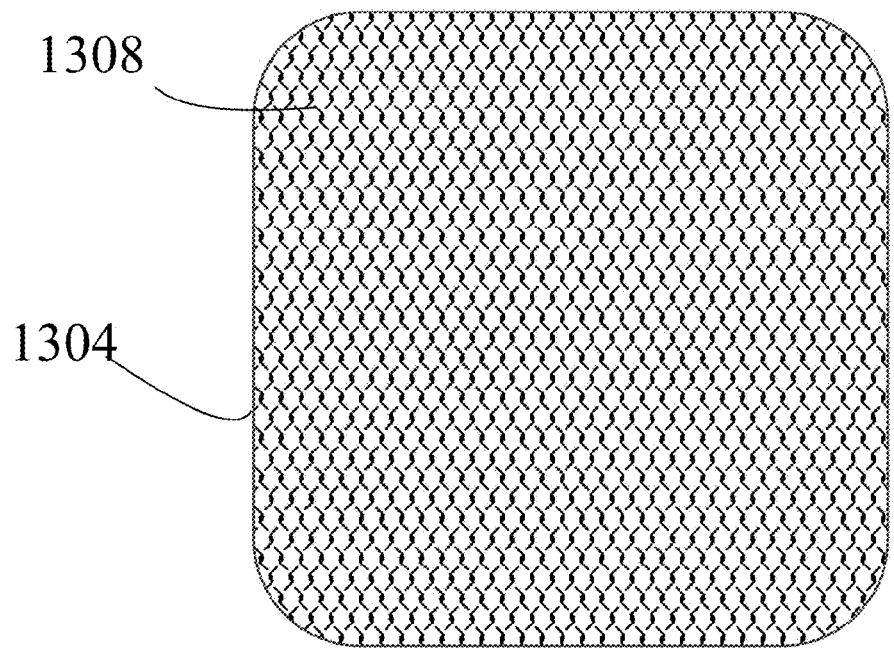
FIG. 13 is a bottom planform view of a single panel of the invention showing another potential traction enhancing tread pattern.

FIG. 13 is a bottom planform view of a single panel of the invention showing another potential traction enhancing tread pattern. Panel 1304 in this case does not have individual traction aids as above but instead has a corrugated or roughed or textured undersurface 1308. This may provide a different type of traction assistance. Testing has revealed that different types of traction aids may have different results on different surfaces: one type may be superior on snow and another on ice, and so on.

Figure 14:
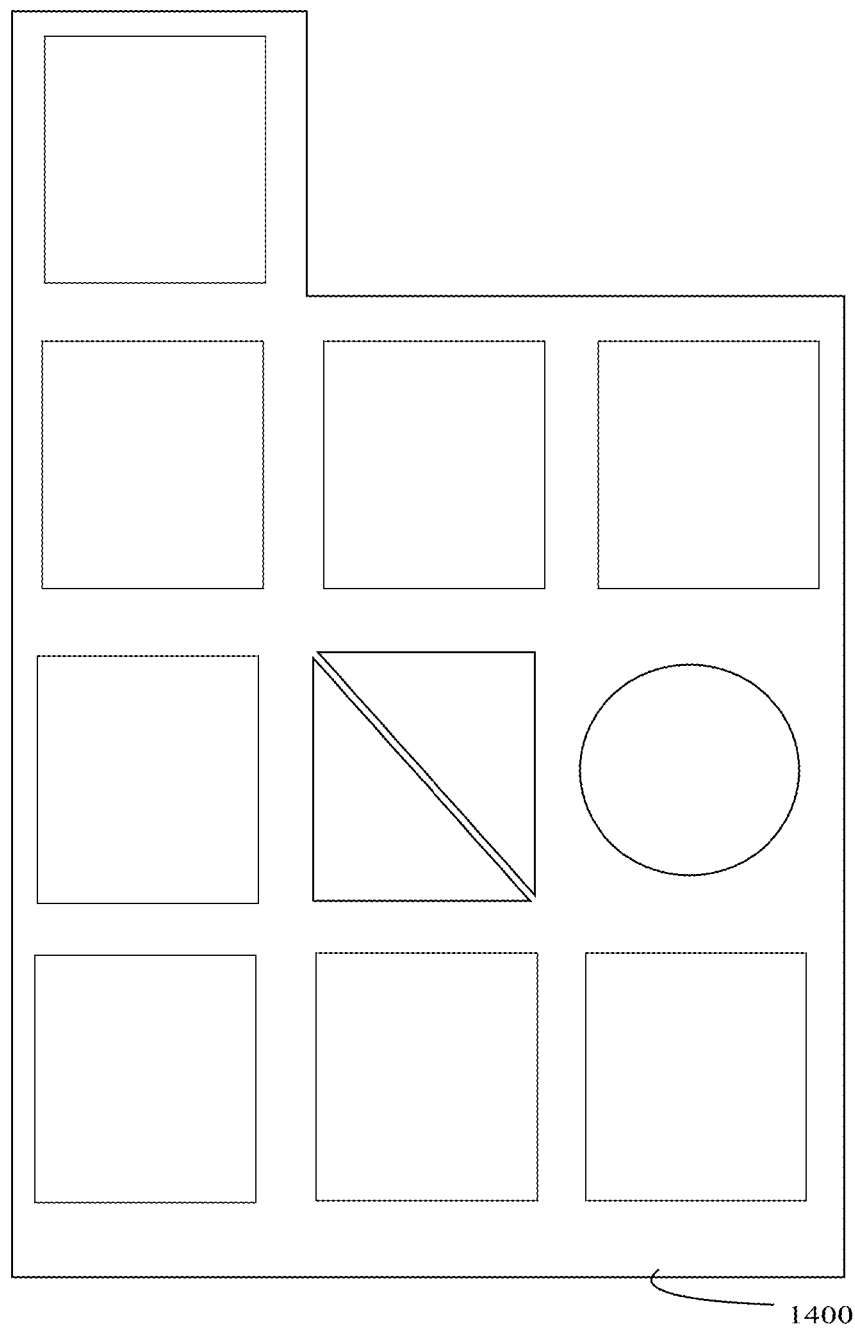
FIG. 14 is a planform view showing a completely hypothetical whimsical embodiment of the mat (not presently in any way planned) showing how triangles or circles might be used as panels

FIG. 14 is a planform view showing a completely hypothetical whimsical embodiment of the mat (not presently in any way planned) showing how triangles or circles might be used as panels. Note that circles in particular will leave enormous rounded substrate areas exposed, which is extremely undesirable. Triangles might be interesting.

Figure 15:
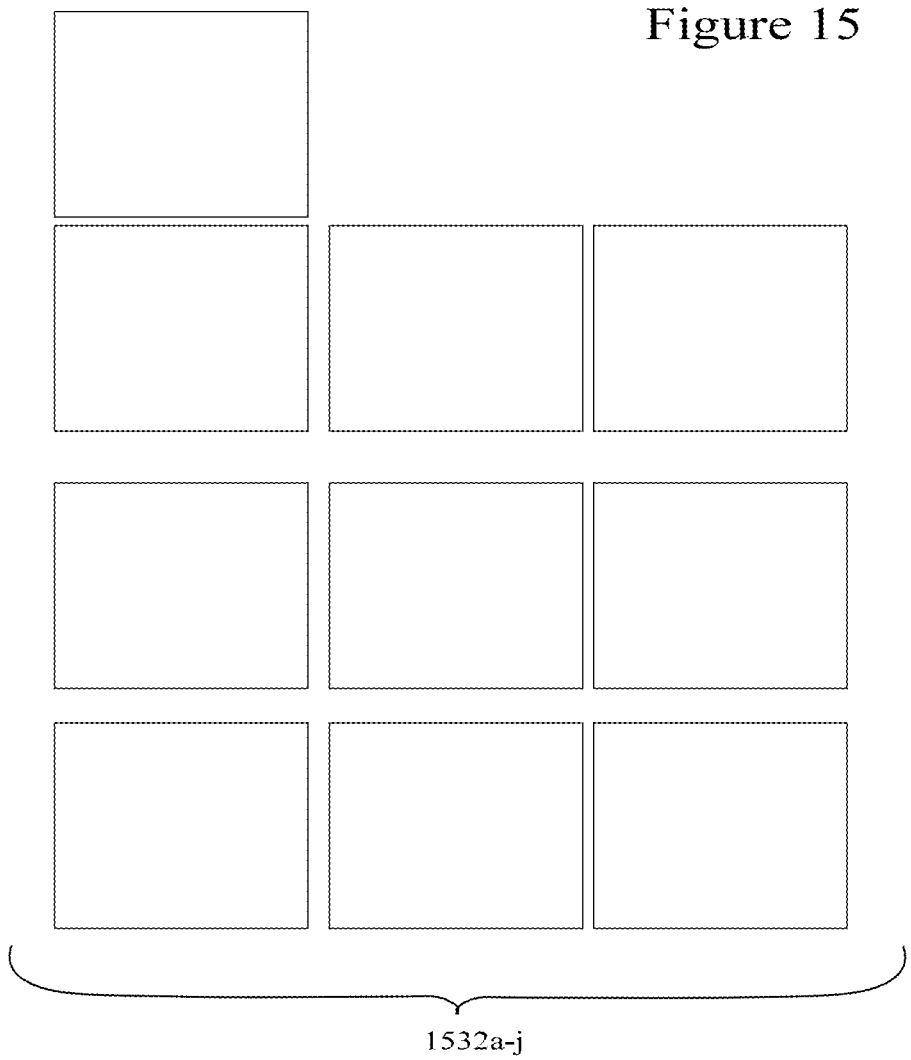
FIG. 15 is a planform view of 10 square panels according to the invention, however, in a stage of production and not the final device.

FIG. 15 is a planform view of 10 square panels according to the invention, however, in a stage of production and not the final device. The panels have been arranged as if they were about to be applied to a base layer of the invention but have not yet been so applied. Panels 1532a-j (ten panels total) may be seen to be of uniform size and shape.

Figure 16:
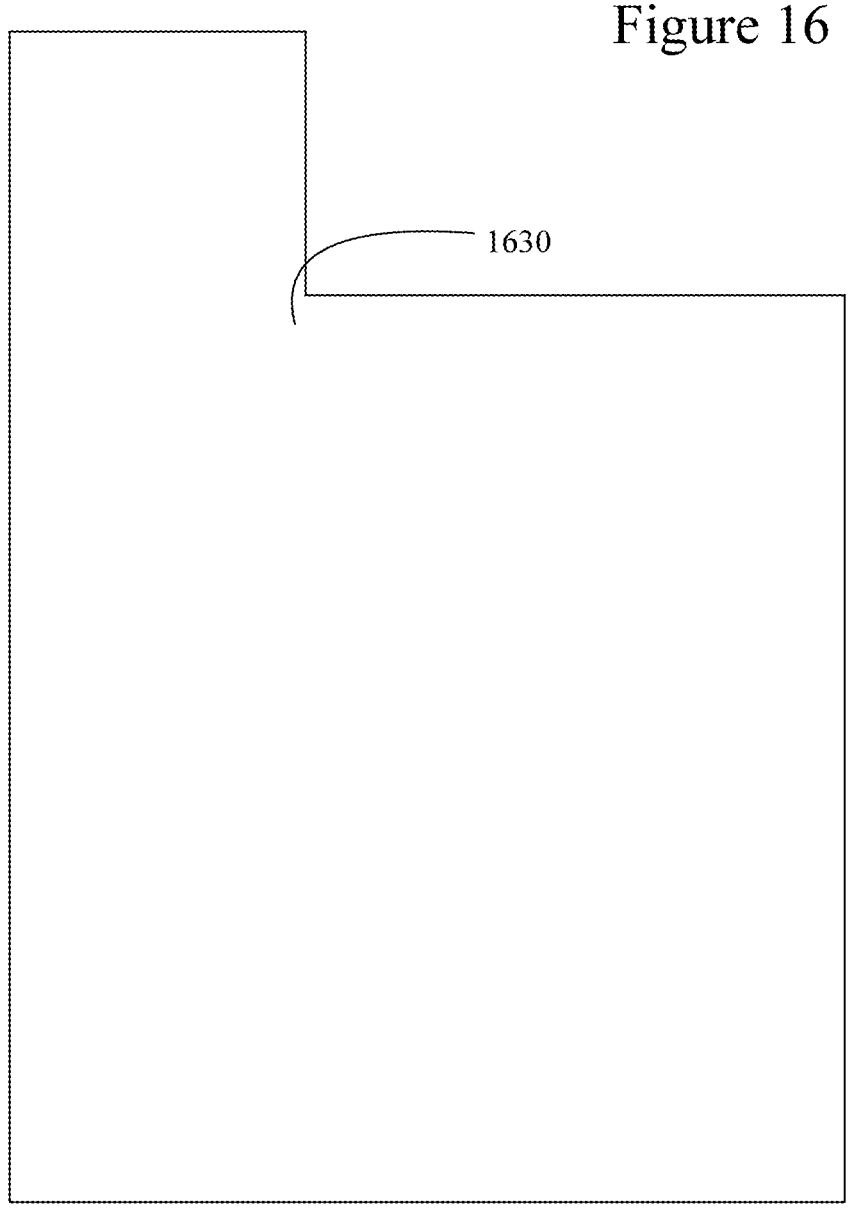
FIG. 16 is a view of a base layer of the invention without any panels attached, showing the outline of the shape of the invention.

FIG. 16 is a view of a base layer of the invention without any panels attached, showing the outline of the shape of the invention. Base layer 1630 generally matches the arrangement of panels seen in FIG. 15.

Figure 17:
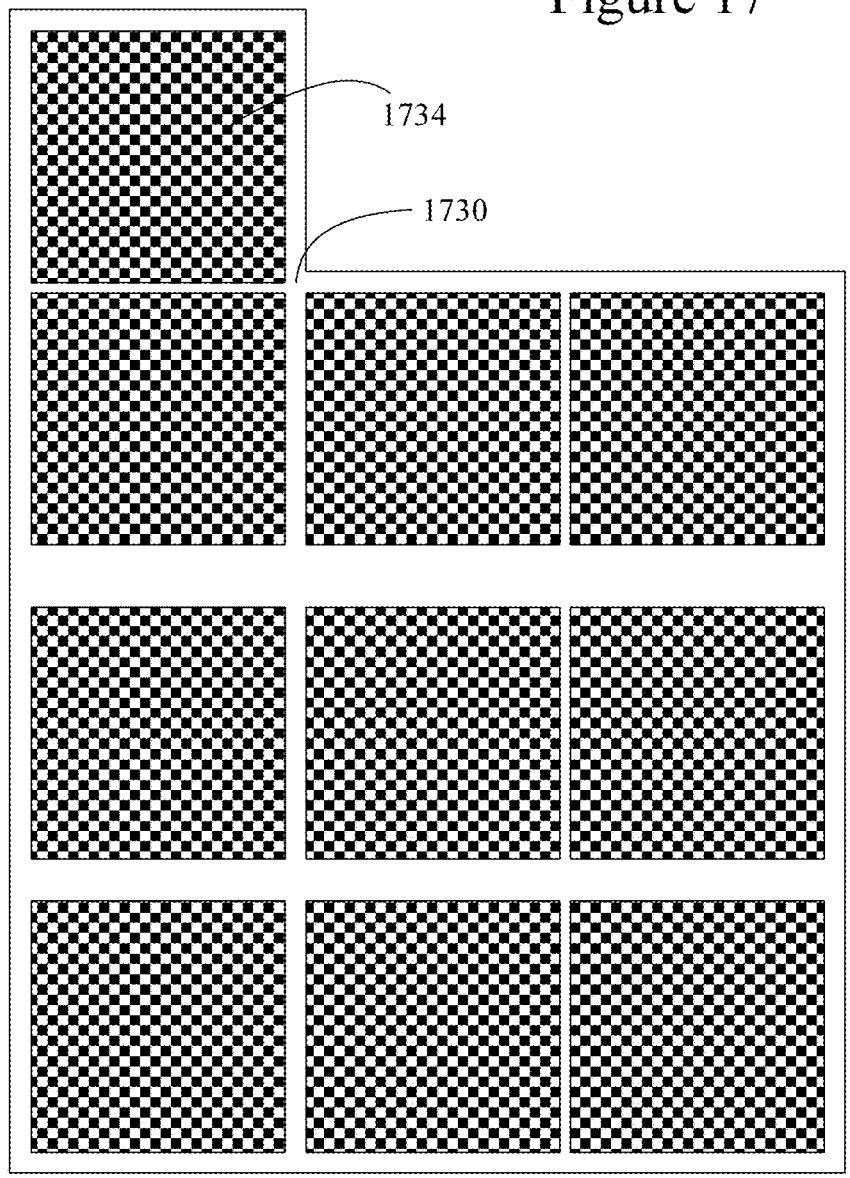
FIG. 17 is of course a view of the panels on the base layer.

FIG. 17 is of course a view of the panels on the base layer. Base layer 1730 has now received the panels 1734 in their various locations on the base. As discussed previously, the arrangement of these panels on the base layer is quite important to the operation of the invention for single handed folding.

FIG. 18 is a planform view of an alternative embodiment of the base layer of the invention in which the base layer has holes corresponding to areas covered by the panels in any case (the squares shown are not panels but holes, each smaller than the panel which will cover the hole). The reason for holes 1836 is not so much to save material in production (although high quality EDPM rubber or neoprene or other rubbers is expensive) but also to produce panels which may have their bottom surfaces in contact with the ground, and thus make use of the traction aids, or inherent friction properties, of the panels.

Base layer with holes 1830 may thus be understood to be in production. It may be produced with hole 1836 by means of a mold or the like, or the hole may be die cut or otherwise removed. Note that each hole 1836 is smaller than the corresponding panel (such as panel 1532a or 1532a j) which will cover that hole. The panel overlaps the material between the holes and thus may be easily secured thereto, for example by bonding, chemical welding, heat welding, sonic welding and so on.

FIG. 19 is a planform view of a presently preferred embodiment and best mode now contemplated for carrying out the invention, showing a different indicia marking, rounded corners, a small hole with an extra grip, advertising material and so on.

Mat 1900 has a rounded interior base corner 1940 as well as rounded panel corner 1942. In addition, testing has revealed that interior corner 1942 between the mud-flap and the interior side panel is a high stress point. Therefore, corner 1942 may in embodiments be reinforced. In this embodiment it is rounded, which provides reduction of stress and reinforcement, and furthermore the edge of the corner is raised along the arc of the edge, for even more strength.

Hole/reinforced hole 1946 may be seen to have a nearby extra grip 1948, again to aid the user in picking up the correct corner and thus automatically beginning the fold sequence which cooperates with the separation distances to allow the mat to fold dramatically smaller.

Preferred indicia 1947 are a series of circles and arrow shaped circles with matching numbers: the user very quickly realizes that like numbers fold to like numbers and from then on can do one handed folding without touching dirty edges or the like.

Advertising/trade name 1949 may be used for the name of the manufacturer, or may be for product placement, promotions and so on. This can be included in molding, incised later, or be printed onto the device. Notice that the eye-catching mud-flap provides a unique location for such materials.

Figure 20:
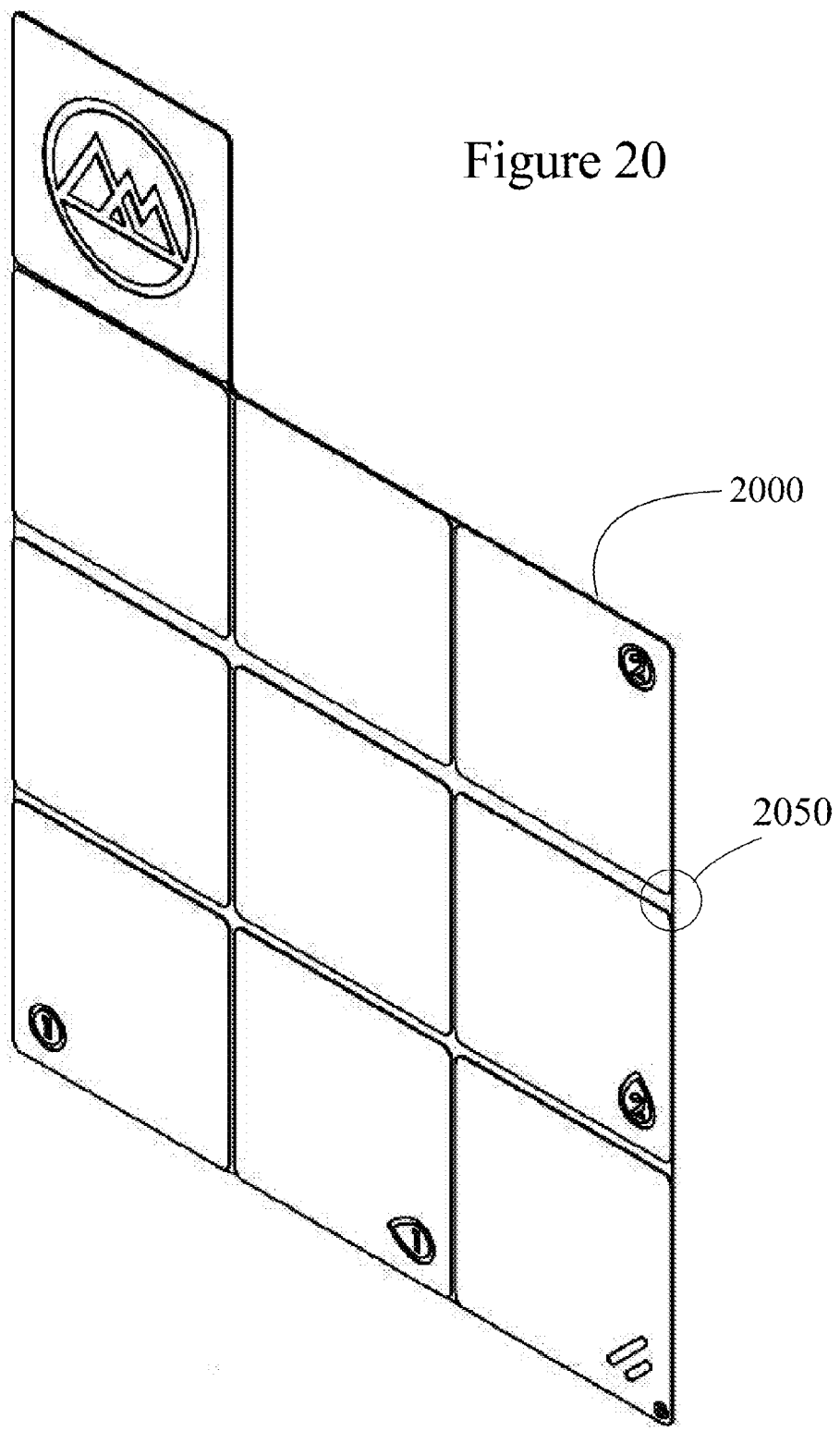
FIG. 20 is an elevated orthogonal view of the preferred embodiment showing how the thickness of panels differs in comparison to the thickness of the base layer only.

FIG. 20 is an elevated orthogonal view 2000 of the preferred embodiment showing how the thickness of panels differs in comparison to the thickness of the base layer only. At circle 2050 the thickness difference between the panels and the base layer may be perceived, even at 1:5 scale to the real mat and with a net differences of less than 2 mm.

Figure 21:
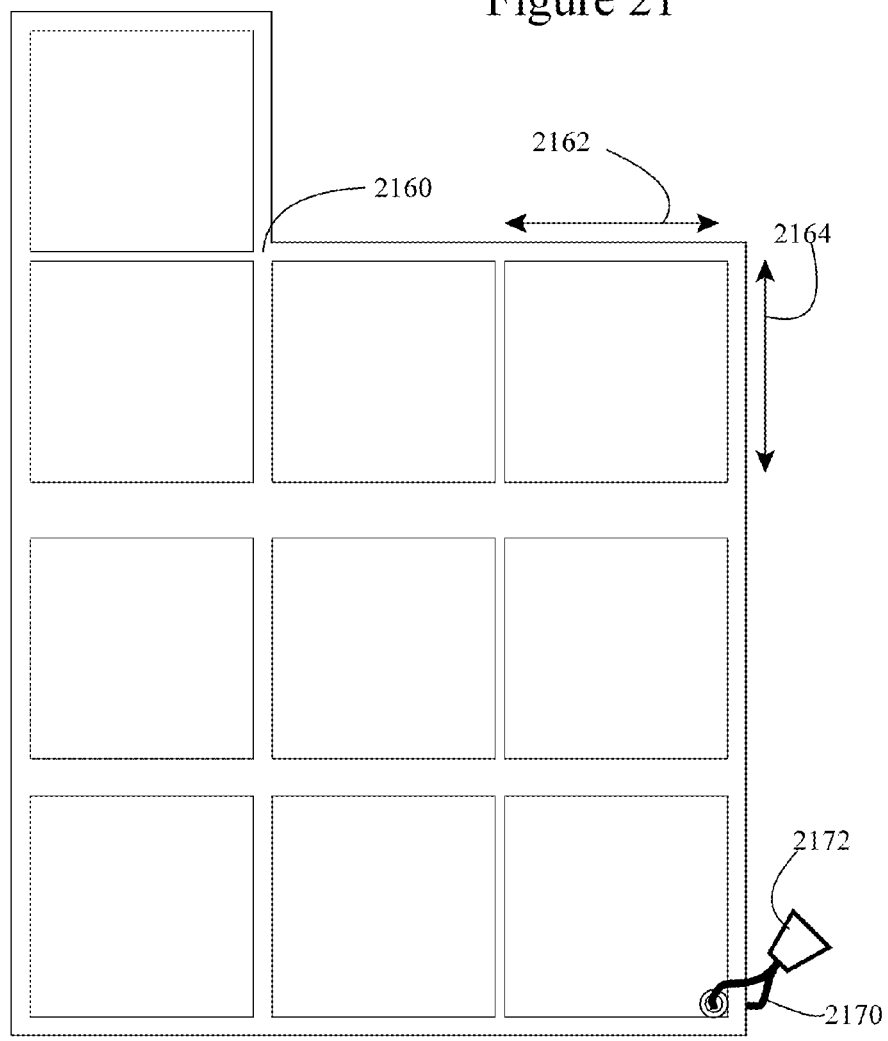
FIG. 21 is a planform view of a unibody construction of a single molded unit in which the panels are raised areas on a single layer, also showing the length and width of the panels and a hole with grommet and a cord passing through with a grip body/bob thereon.

FIG. 21 is a planform view of a unibody construction in which the panels are raised areas on a single layer, also showing the length and width of the panels and a hole (in alternative embodiments, a hole with reinforcing) and a cord passing through with a grip body/bob thereon.

Unibody 2160 may be manufactured more simply than the more durable two layer embodiment, hypothetically a commercial advantage in competition against the "foam sandwich" construction of the prior art. Uniform panel width 2162 and uniform panel length 2164 are exemplary not just to this embodiment to any previously shown embodiment. In this particular case the panels are square but this is not required. It is preferred to use panels of uniform size and shape, but this also is not required.

Cord 2170 terminates in grip/body 2172, again to not only aid the user in folding but to mentally orient the user as to how to begin folding. Note that the cord may be looped, thus allowing the mat of the invention to be hung up easily so that it may air dry.

Throughout this application, various publications, patents, and/or patent applications are referenced in order to more fully describe the state of the art to which this invention pertains. The disclosures of these publications, patents, and/or patent applications are herein incorporated by reference in their entireties, and for the subject matter for which they are specifically referenced in the same or a prior sentence, to the same extent as if each independent publication, patent, and/or patent application was specifically and individually indicated to be incorporated by reference.

Methods and components are described herein. However, methods and components similar or equivalent to those described herein can be also used to obtain variations of the present invention. The materials, articles, components, methods, and examples are illustrative only and not intended to be limiting.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art.

Having illustrated and described the principles of the invention in exemplary embodiments, it should be apparent to those skilled in the art that the described examples are illustrative embodiments and can be modified in arrangement and detail without departing from such principles. Techniques from any of the examples can be incorporated into one or more of any of the other examples. It is intended that the specification and examples be considered as exemplary only, with a true scope and spirit of the invention being indicated by the following claims.

I claim:

1. A mat, the mat comprising:
   an array of nine panels of a resilient cushioning material arranged in a rectilinear pattern of three rows by three columns, the panels having a uniform width and uniform length, the panels not directly connected to one another, the array of nine panels having at least a first corner and a second corner, the second corner diagonally distal from the first corner, each panel having a thickness X;
   a mud-flap, dimensioned and configured to match a single panel of the array and disposed adjacent to a panel at the corner of the array;
   the array of nine panels and the mud-flap connected to one another by a flexible backing comprising a base layer providing separations between each panel and all other panels and the mud-flap, with a total of five separations, the mat having a top surface defined by the array of nine panels and the mud-flap and having a bottom surface comprising the flexible backing material;
   a first one of the separations being between a first and a second row and a second one of the separations being between the second and a third row;
   a third separation between a first and a second column and a fourth separation between the second and a third column;
   a fifth separation between the mud-flap and the corner
   each separation having a width which is a multiple of the panel thickness X, wherein the separation widths are defined as follows: the first separation width being 2X, the third separation width being 6X, the fourth separation width being 4X, and the second and fifth separations being greater than zero.

2. The mat of claim 1, further comprising:
   indicia upon the top surface, indicating that a first valley fold should be made at the first separation, a second mountain fold should be made at the second separation, a third valley fold should be made at the third separation, a fourth mountain fold should be made at the fourth separation, and a fifth mountain fold/book fold should be made at the fifth separation.

3. The mat of claim 2, further comprising:
   a handhold disposed at the second corner.

4. The mat of claim 3, wherein the panels further comprise an EPDM rubber material having a durometer hardness of at least 80.

5. The mat of claim 4, wherein the flexible backing material is one member selected from the group consisting of: the same material as the panels, a different material from the panels, and combinations thereof.

6. The mat of claim 4, wherein the flexible backing material is one member selected from the group consisting of: nylon, polyester, and combinations thereof.

7. A method of folding the mat of claim 1 from an open position, the method comprising the steps of:
   carrying out a valley fold at the first separation;
   doing a mountain fold along the second separation;
   doing a valley fold at the third separation;
   doing a mountain fold at the fourth separation; and
   doing a book fold at the fifth separation;
   whereby the entire mat is folded with the bottom surface entirely facing other parts of the bottom surface and no part of the top surface facing any part of the bottom surface, and due to the folding the mat is the uniform length and uniform width of a single panel and has a thickness of 10X.

8. The mat of claim 3, wherein each panel comprises: a square shape, whereby the uniform length and the uniform width are the same.

9. The mat of claim 8, wherein each panel has rounded corners.

10. The mat of claim 9, wherein the bottom surface further comprises a traction aid.

11. The mat of claim 10, wherein the traction aid comprises one member selected from the group consisting of: multiple cross-shaped protrusions, multiple circular protrusions, multiple toroidal protrusions, a roughened area, and combinations thereof.

12. A mat, the mat comprising:
   a resilient material having an array of nine raised panels of uniform length and width, arranged in a rectilinear pattern of three rows by three columns, each panel having a thickness X, the nine panels connected to one another by the resilient material;
   separations between the panels, with a total of at least four separations, the mat having a top surface defined by the array of nine panels and having a bottom surface comprising the resilient material;
   a first separation between a first and second row and a second separation between the second and a third row;

a third separation between a first and second column and a fourth separation between the second and a third column.

each separation having a width, wherein the separation widths are defined as follows: the first separation width being 2X, the second separation being approximately zero, the third separation width being 6X, the fourth separation width being 4X.

13. A method of folding the mat of claim 12 from an open position, the method comprising the steps of:
carrying out a valley fold at the first separation;
doing a mountain fold along the second separation;
doing a valley fold at the third separation; and
doing a mountain fold at the fourth separation;
whereby the entire mat is folded with no part of the top surface facing any part of the bottom surface and the mat is the length and width of a single panel and is the thickness of nine panels.

14. The mat of claim 12, further comprising:
indicia upon the top surface, indicating that a first valley fold should be made at the first separation, a second mountain fold should be made at the second separation, a third valley fold should be made at the third separation, and a fourth mountain fold should be made at the fourth separation.

15. The mat of claim 14, further comprising:
a handhold disposed at a first corner.

16. The mat of claim 15, wherein the handhold comprises:
a hole passing through the mat;
a cord passing through the grommet and secured thereto;
a grip secured to the cord.

17. The mat of claim 16, wherein the handhold further comprises:
a grommet in the hole.

18. The mat of claim 16, wherein the bottom surface further comprises a traction aid having a thickness and a location on the bottom surface one panel.

19. The mat of claim 18, wherein the traction aid comprises one member selected from the group consisting of: multiple cross-shaped protrusions, multiple circular protrusions, multiple toroidal protrusions, a roughened area, and combinations thereof.

20. The mat of claim 18, wherein the traction aid on a first panel has a different location than the traction aid on a second panel, whereby when the two panels are folded together after a mountain fold, the traction aids nonetheless do not impact one another and the thickness of the folded mat is increased by only the thickness of a single traction aid, not double the thickness of the traction aid.

* * * * *